United States Patent [19]

Parker et al.

[11] Patent Number: 5,124,430
[45] Date of Patent: Jun. 23, 1992

[54] ARYLENE CARBONATE CYANOARYL ETHER COPOLYMER

[75] Inventors: Theodore L. Parker, Walnut Creek; Thomas O. Jeanes, Antioch, both of Calif.

[73] Assignee: The Dow Chemical Company, Midland, Mich.

[21] Appl. No.: 573,927

[22] Filed: Aug. 28, 1990

[51] Int. Cl.$^5$ .............................................. C08G 64/04
[52] U.S. Cl. .................................... 528/176; 528/190; 528/191; 528/193; 528/203
[58] Field of Search ............... 528/176, 190, 191, 193, 528/203

[56] References Cited

U.S. PATENT DOCUMENTS

| | | | |
|---|---|---|---|
| 3,419,526 | 12/1968 | Schnell et al. | 260/49 |
| 4,260,719 | 4/1981 | Ching | 526/196 |
| 4,567,248 | 1/1986 | Blinne et al. | 528/211 |
| 4,640,974 | 2/1987 | Matsuo et al. | 528/211 |
| 4,640,975 | 2/1987 | Matsuo et al. | 528/211 |
| 4,663,427 | 5/1987 | Matsuo et al. | 528/211 |
| 4,703,104 | 10/1987 | Matsuo et al. | 528/211 |
| 4,812,507 | 3/1989 | Matsuo et al. | 524/611 |
| 4,972,016 | 11/1990 | Murakami | 524/449 |

Primary Examiner—Harold D. Anderson
Attorney, Agent, or Firm—Janet Pauline Clark

[57] ABSTRACT

The invention relates to novel aryl carbonate cyanoaryl ether copolymers.

15 Claims, No Drawings

ARYLENE CARBONATE CYANOARYL ETHER COPOLYMER

BACKGROUND OF THE INVENTION

This invention relates to novel aryl carbonate cyanoaryl ether copolymers.

A number of polymers have been developed for use as high performance engineering thermoplastics, including polyarylethersulfone, polybenzoxazole, and polyetheretherketone. High performance engineering thermoplastics generally possess excellent thermal and oxidative stability, as well as good mechanical properties. Such thermoplastics are extensively used in place of metals and glass in many applications throughout the industry, particularly in automotive, aerospace, electronic, and packaging applications. Such thermoplastics possess utility in a wide variety of applications as fibers, films, molded articles, foams, coatings, and the like.

The problem associated with many of the high performance engineering thermoplastics developed to date is that they are difficult and/or expensive to synthesize and fabricate. What is needed are high performance engineering thermoplastics which are readily synthesized and fabricated. Such thermoplastics should possess good thermal and mechanical properties.

SUMMARY OF THE INVENTION

The invention is a novel aryl carbonate cyanoaryl ether copolymer which comprises a copolymer with a backbone structure corresponding to the formula:

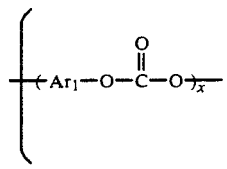

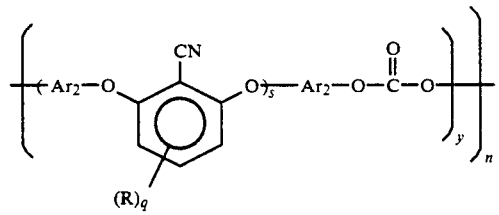

wherein
$Ar_1$ and $Ar_2$ are each individually a divalent aromatic residue selected from the group consisting of:
A. an unsubstituted or inertly substituted phenylene, unsubstituted or inertly substituted naphthylene:

B. 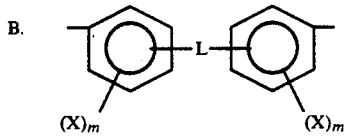

wherein
L is selected from the group consisting of a direct bond, a divalent $C_{1-15}$ hydrocarbyl radical, a divalent $C_{1-8}$ halohydrocarbyl radical, —O—, —CO—, —S—, —SO—, —SO$_2$—, and —SS—, X is individually in each occurrence selected from the group consisting of a hydrogen radical, a monovalent $C_{1-4}$ hydrocarbyl radical, a $C_{1-4}$ halohydrocarbyl radical, and a halogen, and
m is a positive integer between 1 and 4 inclusive; and
C. a divalent bisphenyl fluorenyl or spiro indanyl radical;

R is individually in each occurrence selected from the group consisting of a hydrogen radical, a monovalent $C_{1-4}$ hydrocarbyl radical, a $C_{1-4}$ halohydrocarbyl radical, and a halogen, and
q is a positive integer between 1 and 3 inclusive;
s is a positive integer between about 1 and about 250 inclusive;
x is a positive integer between about 0 and about 250 inclusive, and
y is a positive integer between about 1 and about 500 inclusive,
wherein
the ratio of $y/(x+y)$ is between about 0.25 and 1 inclusive; and
n is a positive integer representing a degree of polymerization which provides a number-average molecular weight of at least about 4,000.

The copolymers of this invention possess excellent thermal stability, adequate mechanical strength, good temperature resistance, good solvent resistance, and are readily fabricated.

DETAILED DESCRIPTION OF THE INVENTION

The aryl carbonate cyanoaryl ether copolymers of this invention are random copolymers which contain cyanoaryl ether carbonate segments and optionally aryl carbonate segments. The aryl carbonate cyanoaryl ether copolymers preferably possess a polymer backbone structure corresponding to Formula 1:

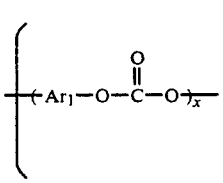

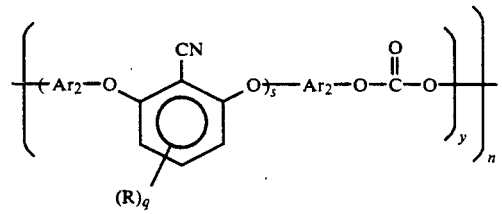

wherein
$Ar_1$ and $Ar_2$ are each individually a divalent aromatic residue selected from the group consisting of:
A. an unsubstituted or inertly substituted phenylene, unsubstituted or inertly substituted naphthylene:

B. 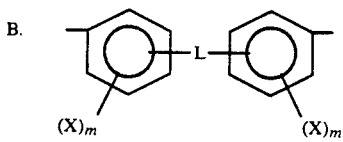

wherein
L is selected from the group consisting of a direct bond, a divalent $C_{1-15}$ hydrocarbyl radical, a divalent $C_{1-8}$ halohydrocarbyl radical, —O—, —CO—, —S—, —SO—, —SO$_2$—, and —SS—, X is individually in each occurrence selected from the group consisting of a hydrogen radical, a monovalent $C_{1-4}$ hydrocarbyl radical, a monovalent $C_{1-4}$ halohydrocarbyl radical, and a halogen, and m is a positive integer between 1 and 4 inclusive; and C. a divalent bisphenyl fluorenyl or spiro indanyl radical:

R is individually in each occurrence selected from the group consisting of a hydrogen radical, a monovalent $C_{1-4}$ hydrocarbyl radical, a $C_{1-4}$ halohydrocarbyl radical, and a halogen, and q is a positive integer between 1 and 3 inclusive;

s is a positive integer between about 1 and about 250 inclusive;

x is a positive integer between about 0 and about 250 inclusive, and y is a positive integer between about 1 and about 500 inclusive, wherein
the ratio of y/(x+y) is between about 0.25 and 1 inclusive; and n is a positive integer representing a degree of polymerization which provides a number-average molecular weight of at least about 4,000.

In the embodiments wherein Ar$_1$ and/or Ar$_2$ comprise an inertly substituted phenylene or naphthylene, the phenolic rings are substituted with inert substituents, that is, substituents which do not substantially interfere with use of the copolymer in the intended application. In many applications, this means that the inertly substituted sites on the phenolic rings are substantially chemically unreactive. Preferred inert substituents include monovalent $C_{1-8}$ hydrocarbyl radicals, monovalent $C_{1-8}$ hydrocarbyloxy radicals, and halogens. More preferred inert substituents include monovalent $C_{1-4}$ hydrocarbyl radicals, monovalent $C_{1-4}$ hydrocarbyloxy radicals, and halogens. Preferred halogens are fluorine, chlorine, bromine, and iodine; more preferred halogens are fluorine, chlorine, and bromine; even more preferred halogens are fluorine and chlorine: the most preferred halogen is fluorine.

In the embodiments wherein Ar$_1$ and/or Ar$_2$ comprise

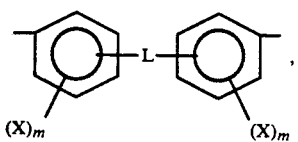

L is preferably a direct bond, a divalent $C_{1-8}$ hydrocarbyl radical, a divalent $C_{1-4}$ halohydrocarbyl radical, —O—, —CO—, —S—, —SO—, —SO$_2$—, or —SS—; L is more preferably a direct bond, a divalent $C_{1-4}$ hydrocarbyl radical, a divalent $C_{1-4}$ halohydrocarbyl radical, —O—, —CO—, —S—, —SO—, —SO$_2$—, or —SS—; L is even more preferably a direct bond, a divalent $C_{1-3}$ hydrocarbyl radical, or a divalent $C_{1-3}$ fluorohydrocarbyl radical; L is most preferably a direct bond or an unsubstituted or fluoro-substituted methylene or isopropylidene radical.

X is preferably a hydrogen radical, a monovalent $C_{1-3}$ hydrocarbyl radical, a monovalent $C_{1-3}$ halohydrocarbyl radical, or a halogen. For X, preferred halohydrocarbyl radicals include fluorohydrocarbyl radicals and preferred halogens include fluorine.

R is preferably a hydrogen radical, a monovalent $C_{1-2}$ hydrocarbyl radical, a $C_{1-2}$ halohydrocarbyl radical, or a halogen. For R, preferred halohydrocarbyl radicals include chloro-, bromo-, and fluorohydrocarbyl radicals and preferred halogens include chlorine, bromine, and fluorine.

x is preferably a positive integer between about 0 and about 100 inclusive, more preferably a positive integer between about 0 and about 50 inclusive, even more preferably a positive integer between about 0 and about 10 inclusive.

y is preferably a positive integer between about 1 and about 250 inclusive, more preferably a positive integer between about 1 and about 100 inclusive. The ratio of y/(x+y) is preferably between about 0.35 and about 1 inclusive, more preferably between about 0.50 and about 1 inclusive, even more preferably between about 0.75 and about 1 inclusive.

The aryl carbonate cyanoaryl ether copolymers of this invention may be prepared by reaction of a solution containing a bisphenolic capped cyanoaryl ether oligomer with phosgene in the presence of a base. Optionally, a solution containing a mixture of the bisphenolic capped cyanoaryl ether oligomer and a second bisphenolic compound may be treated with phosgene in the presence of a base to provide a random aryl carbonate/aryl carbonate cyanoaryl ether copolymer. The bisphenolic capped cyanoaryl ether oligomer preferably possesses a number-average molecular weight of between about 325 and about 6,000. The reaction with phosgene is preferably carried out under an inert atmosphere such as nitrogen. The polymerization reaction is carried out at an appropriate temperature for a period of time for the copolymer to achieve a useful degree of polymerization. Such reaction temperatures are typically subambient, that is, less than about 25° C., so that the reaction proceeds at a controllable rate. The reaction mixture is preferably acidified, for example by adding a dilute solution of hydrochloric acid, the organic layer separated, and the copolymer precipitated in an alcohol such as methanol. The precipitated copolymer is preferably filtered, optionally washed to further purify the product, and dried.

The copolymers so formed possess a number-average molecular weight (Mn) such that the copolymers are useful for forming fibers, films, molded articles, foams, coatings, and the like. The number-average molecular weight of such copolymers as measured by gel permeation chromatography is preferably at least about 4,000, more preferably at least about 10,000; the number-average molecular weight of such copolymers is preferably less than about 100,000, more preferably less than about 60,000. The intrinsic viscosity of such copolymers is preferably between about 0.1 and about 1.2 deciliters/gram, more preferably between about 0.2 and about 0.9 deciliters/gram as measured in a dipolar aprotic solvent such as N-methyl-2-pyrrolidinone or dimethylacetamide. The copolymers of this invention are preferably soluble in common dipolar aprotic solvents such as N-methyl-2-pyrrolidinone, dimethylacetamide, dimethylformamide, dimethylsulfoxide, sulfolane, and chlorinated hydrocarbons.

The copolymers of this invention preferably possess glass transition temperatures of at least about 75° C., more preferably of at least about 125° C. The copolymers preferably possess a tensile strength as measured by ASTM D-1708 of at least about 4,000 psi, more preferably of at least about 5,000 psi. The copolymers preferably possess a tensile modulus as measured by ASTM D-1708 of at least about 100 kpsi, more preferably of at least about 150 kpsi. The copolymers preferably possess an elongation at break as measured by ASTM D-1708 of at least about 2 percent, more preferably of at least about 4 percent.

The copolymers of this invention may optionally be cross-linked by reaction with a polyepoxide compound in the presence of an initiator/catalyst for the reaction of aromatic carbonate linkages with epoxy groups. Examples of suitable initiators/catalysts include tetraorgano phosphonium salts and hexaorgano phosphoranylidene ammonium (phosphine iminium) salts. The stoichiometric ratio for the cross-linking reaction is one aromatic carbonate linkage to two epoxide groups (oxirane rings). The cross-linking reaction is preferably conducted at elevated temperatures, preferably above about 100° C., more preferably above about 125° C. The cross-linking reaction is preferably carried out at temperatures below about 250° C. The cross-link density in the final cross-linked copolymer may be controlled by the distance between aromatic carbonate linkages in the aryl carbonate cyanoaryl ether copolymer and the amount of polyepoxide compound, up to the stoichiometric amount, reacted with the aryl carbonate cyanoaryl ether. Examples of suitable polyepoxide compounds include diglycidyl ethers of bisphenol A, polyglycidyl ethers of phenol-formaldehyde, cresol-formaldehyde novolacs, and hydrocarbon polyepoxides, such as the diepoxide of vinyl cyclohexene. The cross-linked copolymer exhibits increased solvent resistance, increased temperature resistance, and decreased elongation at break compared to the uncross-linked copolymer.

The copolymers of this invention are useful in forming fibers, films, molded articles, foams, and the like. In particular, the polymers of this invention possess utility as high performance engineering thermoplastics and as semi-permeable gas separation membranes.

SPECIFIC EMBODIMENTS

The following Examples are included to illustrate the invention and are not intended to limit the scope of the invention or claims.

EXAMPLE 1

Preparation Of Bis Phenolic Cyanoaryl Ether Copolymer From 1200 Molecular Weight Oligomer A copolymer of Formula I wherein $Ar_2$ is a divalent bisphenol A aromatic residue, R is a hydrogen radical, q is 3, y is 1, x is 0, and s is 3 was synthesized using the following procedure.

A round bottomed flask equipped with a mechanical stirrer, Dean-Stark apparatus, condenser, controller probe, and gas inlet and outlet was charged with about 80 milliliters of N-methyl-2-pyrrolidinone, about 65 milliliters of toluene, about 18.24 grams para-bisphenol A (2,2-bis(4-hydroxyphenyl)propane) and about 22.63 grams potassium carbonate. The flask was slowly purged with nitrogen during the polymerization. The reaction mixture was heated and the water removed azeotropically at about 150° C over a period of about 1 and ¾ hours. The toluene was then distilled out at about 160° C. and removed from the flask. About 8.34 grams 2,6-difluorobenzonitrile was added to the flask which was then heated at about 160° C. for about 16 hours. The reaction mixture was then cooled, diluted with tetrahydrofuran, neutralized with acetic acid, and filtered through a glass frit. The oligomer was precipitated by pouring the filtrate into water. The precipitate was collected by filtration, washed with water, and dried under vacuum, yielding about 22.5 grams of oligomer with a calculated theoretical molecular weight of about 1200.

A round bottomed flask equipped with a mechanical stirrer and nitrogen purge was charged with about 6.05 grams of the 1200 molecular weight oligomer previously prepared, solubilized in about 20 milliliters methylene chloride and about 1.05 milliliters of pyridine The resulting solution was immersed in an ice bath and cooled for about 10 minutes. Phosgenation of the oligomer was accomplished by adding a solution of phosgene in methylene chloride. Sufficient phosgene was added to bring about a noticeable increase in the solution viscosity. The copolymer was post-capped with methanol subsequent to a positive chloroformate calorimetric test with a small aliquot of 4-(p-nitrobenzylpyridene) and tetrahydrofuran. The organic layer was separated and the copolymer precipitated by addition of methanol. About 5.65 grams of copolymer were obtained, which exhibited an inherent viscosity of about 0.745 deciliters/gram in methylene chloride at about 25° C. at a concentration of about 0.5 grams/deciliter.

The glass transition of the copolymer was determined to be about 173° C. as measured by Differential Scanning Calorimetry (DSC), using a duPont 1090 apparatus scanning at a rate of about 10° C./minute. The copolymer exhibited a tensile strength of about 11,300 psi, a tensile modulus of about 356 kpsi, and an elongation at break of about 15.8 percent as measured by ASTM D-1708.

EXAMPLE 2

Preparation Of Bis Phenolic Cyanoaryl Ether Copolymer From 3200 Molecular Weight Oligomer A copolymer of Formula I wherein $Ar_2$ is a divalent bisphenol A aromatic residue, R is a hydrogen radical, q is 3, y is 1, x is 0, and s is 9 was synthesized by the following procedure.

The apparatus and general procedure of Example 1 was used to prepare about a 3200 molecular weight oligomer (calculated theoretical value) from about 100 milliliters of N-methyl-2-pyrrolidinone, about 75 milliliters of toluene, about 22.80 grams para-bisphenol A (2,2-bis(4-hydroxyphenyl)propane), about 12.51 grams of 2,6-difluorobenzonitrile, and about 28.29 grams potassium carbonate. About 28.4 grams oligomer were obtained.

The apparatus and general procedure of Example 1 was used to polymerize the oligomer, using about 15.86 grams of the 3200 molecular weight oligomer previously prepared, yielding about 15.9 grams of copolymer.

The glass transition of the copolymer was determined to be about 175° C. as measured by Differential Scanning Calorimetry (DSC), using a duPont 1090 apparatus scanning at a rate of about 10° C./minute. The copolymer exhibited a tensile strength of about 13,100 psi, a tensile modulus of about 428 kpsi, and an elongation at break of about 33.2 percent as measured by ASTM D-1708.

EXAMPLE 3

Preparation Of Aryl Carbonate Cyanoaryl Ether Copolymer From 1200 Molecular Weight Oligomer A copolymer of Formula I wherein $Ar_2$ is a divalent bisphenol A aromatic residue, R is a hydrogen radical, q is 3, y is 1, x is 0, and s is 3 was synthesized by the following procedure.

The 1200 molecular weight oligomer prepared in Example 1 was used to prepare an aryl carbonate cyanoaryl ether copolymer using the following procedure.

A round bottomed flask equipped with a mechanical stirrer and nitrogen purge was charged with about 6.05 grams of the 1200 molecular weight oligomer prepared in Example 1 and about 1.14 grams para-bisphenol A, solubilized in about 20 milliliters methylene chloride and about 2.10 milliliters pyridine. The solution was immersed in an ice bath and cooled for about 10 minutes. A solution of phosgene in methylene chloride was slowly added to the stirred solution until a noticeable increase in viscosity occurred. The copolymer was post-capped with methanol subsequent to a positive chloroformate test, then acidified with a dilute solution of hydrochloric acid. The organic layer was separated, and the copolymer precipitated in methanol. The precipitated copolymer was collected by filtration, and dried under vacuum.

The glass transition of the copolymer was determined to be about 173° C. as measured by Differential Scanning Calorimetry (DSC), using a duPont 1090 apparatus scanning at a rate of about 10° C./minute. The copolymer exhibited a tensile strength of about 11,300 psi, a tensile modulus of about 356 kpsi, and an elongation at break of about 15.8 percent as measured by

What is claimed is:

1. An arylene carbonate cyanoarylene ether copolymer which comprises a copolymer with a backbone structure corresponding to the formula:

$$\left\{ \left( Ar_1-O-\overset{O}{\underset{\|}{C}}-O \right)_x \right.$$

$$\left. \left( Ar_2-O-\underset{(R)_q}{\underset{|}{\overset{CN}{\underset{|}{\bigcirc}}}}-O \right)_s -Ar_2-O-\overset{O}{\underset{\|}{C}}-O \right)_y \right\}_n$$

wherein $Ar_1$ and $Ar_2$ are each individually a divalent aromatic residue selected from the group consisting of:

A. an unsubstituted or inertly substituted phenylene, unsubstituted or inertly substituted naphthylene;

B.

$$\underset{(X)_m}{\bigcirc}-L-\underset{(X)_m}{\bigcirc}$$

wherein

L is a direct bond, or L is a divalent $C_{1-15}$ hydrocarbyl radical, a divalent $C_{1-8}$ halohydrocarbyl radical, —O—, —CO—, —S—, —SO—, —SO$_2$—, or —SS—, X is individually in each occurrence selected from the group consisting of a hydrogen radical, a monovalent $C_{1-4}$ hydrocarbyl radical, a $C_{1-4}$ halohydrocarbyl radical, and a halogen, and m is a positive integer between 1 and 4 inclusive; and C. a divalent bisphenyl fluorenyl or spiro indanyl radical;

R is individually in each occurrence selected from the group consisting of a hydrogen radical, a monovalent $C_{1-4}$ hydrocarbyl radical, a $C_{1-4}$ halohydrocarbyl radical, and a halogen, and q is a positive integer between 1 and 3 inclusive;

s is a positive integer between about 1 and about 250 inclusive;

x is a positive integer between about 0 and about 250 inclusive, and y is a positive integer between about 1 and about 500 inclusive, wherein the ratio of $y/(x+y)$ is between about 0.25 and 1 inclusive; and n is a positive integer representing a degree of polymerization which provides a number-average molecular weight of at least about 4,000.

2. The copolymer of claim 1 wherein $Ar_1$ and/or $Ar_2$ comprise an inertly substituted phenylene or naphthylene, wherein the inert substituents are selected from the group consisting of a monovalent $C_{1-8}$ hydrocarbyl radical, a monovalent $C_{1-8}$ hydrocarbyloxy radical, and a halogen.

3. The copolymer of claim 2 wherein the inert substituents are selected from the group consisting of a monovalent $C_{1-4}$ hydrocarbyl radical, a monovalent $C_{1-4}$ hydrocarbyloxy radical, and a halogen.

4. The copolymer of claim 3 wherein the inert substituents comprise a halogen selected from the group consisting of fluorine, chlorine, and bromine.

5. The copolymer of claim 1 wherein $Ar_1$ and/or $Ar_2$ comprise

B.

$$\underset{(X)_m}{\bigcirc}-L-\underset{(X)_m}{\bigcirc}$$

wherein

L is a direct bond, or L is a divalent $C_{1-8}$ hydrocarbyl radical, a divalent $C_{1-4}$ halohydrocarbyl radical, —O—, —CO—, —S—, —SO—, —SO$_2$—, or —SS—.

6. The copolymer of claim 5 wherein L is a direct bond, or L is a divalent C$_{1-4}$ hydrocarbyl radical, a divalent C$_{1-4}$ halohydrocarbyl radical, —O—, —CO—, —S—, —SO—, —SO$_2$—, or —SS—.

7. The copolymer of claim 6 wherein L is a direct bond, or L is a divalent C$_{1-3}$ hydrocarbyl radical, or a divalent C$_{1-3}$ fluorohydrocarbyl radical.

8. The copolymer of claim 7 wherein L is a direct bond, or L is an unsubstituted or fluoro-substituted methylene radical, or an unsubstituted or fluoro-substituted isopropylidene radical.

9. The copolymer of claim 1 wherein Ar$_1$ and/or Ar$_2$ comprise

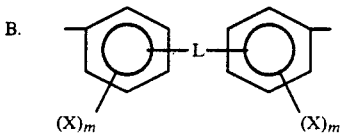

wherein
X is selected from the group consisting of a hydrogen radical, a monovalent C$_{1-3}$ hydrocarbyl radical, a monovalent C$_{1-3}$ halohydrocarbyl radical, and a halogen.

10. The copolymer of claim 9 wherein X is selected from the group consisting of a fluorohydrocarbyl radical and fluorine.

11. The copolymer of claim 1 wherein the copolymer possesses a glass transition temperature of at least about 75° C.

12. The copolymer of claim 11 wherein the copolymer possesses a number-average molecular weight of between about 4,000 and about 100,000.

13. The copolymer of claim 12 wherein the polymer possesses a tensile modulus of at least about 100 kpsi as measured by ASTM D-1708.

14. The copolymer of claim 12 wherein the polymer possesses a tensile strength of at least about 4,000 psi as measured by ASTM D-1708.

15. The copolymer of claim 12 wherein the polymer possesses an elongation at break of at least about 2 percent as measured by ASTM D-1708.

* * * * *